United States Patent [19]
Abbott et al.

[11] Patent Number: 6,133,948
[45] Date of Patent: Oct. 17, 2000

[54] AUTOMATIC IDENTIFICATION OF ARTICLES HAVING CONTOURED SURFACES

[75] Inventors: A. Lynn Abbott, Blacksburg; Bin Yuan, Charlottesville, both of Va.

[73] Assignee: Virginia Tech Intellectual Properties, Inc., Blacksburg, Va.

[21] Appl. No.: 08/753,989

[22] Filed: Dec. 3, 1996

Related U.S. Application Data

[60] Provisional application No. 60/007,951, Dec. 4, 1995.

[51] Int. Cl.[7] .................................................. H04N 8/17
[52] U.S. Cl. ........................................... 348/161; 382/162
[58] Field of Search ................................... 348/161, 128, 348/129, 135, 89, 121, 156; 364/560; 382/162; 356/376; H04N 7/18

[56] References Cited

U.S. PATENT DOCUMENTS

| | | | |
|---|---|---|---|
| 3,868,478 | 2/1975 | Zeenkov | 348/161 |
| 4,201,621 | 5/1980 | Crankshaw et al. | 156/567 |
| 4,929,843 | 5/1990 | Chmielewski, Jr. et al. | 250/561 |
| 4,979,815 | 12/1990 | Tsikos | 356/1 |
| 5,065,237 | 11/1991 | Tsikos et al. | 348/161 |
| 5,067,088 | 11/1991 | Schneiserhan | 348/161 |
| 5,249,053 | 9/1993 | Jain | 358/209 |
| 5,253,302 | 10/1993 | Massen | 382/1 |
| 5,307,151 | 4/1994 | Hof et al. | 356/376 |
| 5,307,152 | 4/1994 | Beohnlein et al. | 356/376 |
| 5,311,999 | 5/1994 | Malow | 348/128 |
| 5,331,118 | 7/1994 | Jensen | 177/25 |
| 5,402,364 | 3/1995 | Kitoh et al. | 364/560 |
| 5,422,861 | 6/1995 | Stringer et al. | 367/99 |
| 5,501,571 | 3/1996 | Van Durrett et al. | 414/786 |
| 5,699,161 | 12/1997 | Woodworth | 356/379 |
| 5,807,042 | 9/1998 | Almblad et al. | 409/83 |
| 5,850,472 | 12/1998 | Alston et al. | 382/162 |

*Primary Examiner*—Chris S. Kelley
*Assistant Examiner*—Tung Vo
*Attorney, Agent, or Firm*—Whitham, Curtis & Whitham

[57] ABSTRACT

An automated identification system comprises a first classification station which uses two laser sources and video imaging techniques to identify and distinguish between similar items such as, for example wooden cabinet doors and drawer fronts. Each laser produces a fan-shaped plane of light, perpendicular to the other, on front face of the door. The fan shaped planes of light produce a first profile stripe in the horizontal direction across the width of the door face and a second profile stripe in the vertical or length direction. A first video camera captures the image of the profile stripe across the width of the door. A second camera is used to capture the profile stripe in the vertical direction to determine whether the panel shape is square or cathedral shaped. A feature-based approach is used to process the captured profile stripes and compare them to a library of known profiles. A third camera, placed substantially parallel to the first camera captures the width measurement of the door. Finally, the length of the door is determined with the aid of a photoelectric sensor which senses the time it takes for the door to pass a point along a moving conveyor. Once the style of the door is determined, the door may pass through a next station where a color camera is used to determine the color of the door. Thereafter, a label identifying the style, size, and color of the door may be affixed to the door prior to shipping.

8 Claims, 10 Drawing Sheets

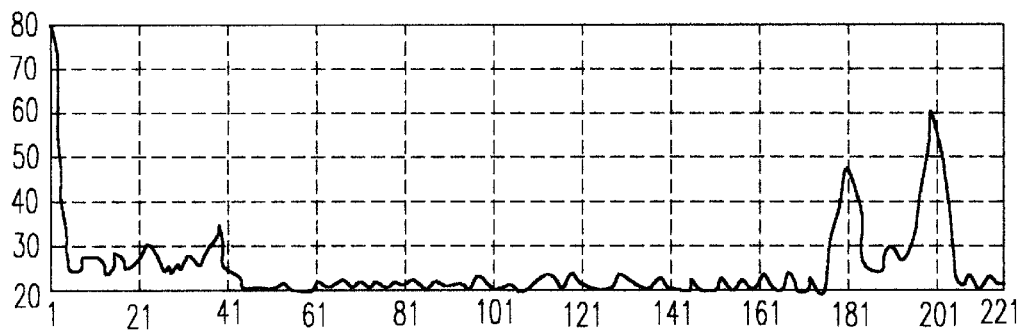
FIG. 12
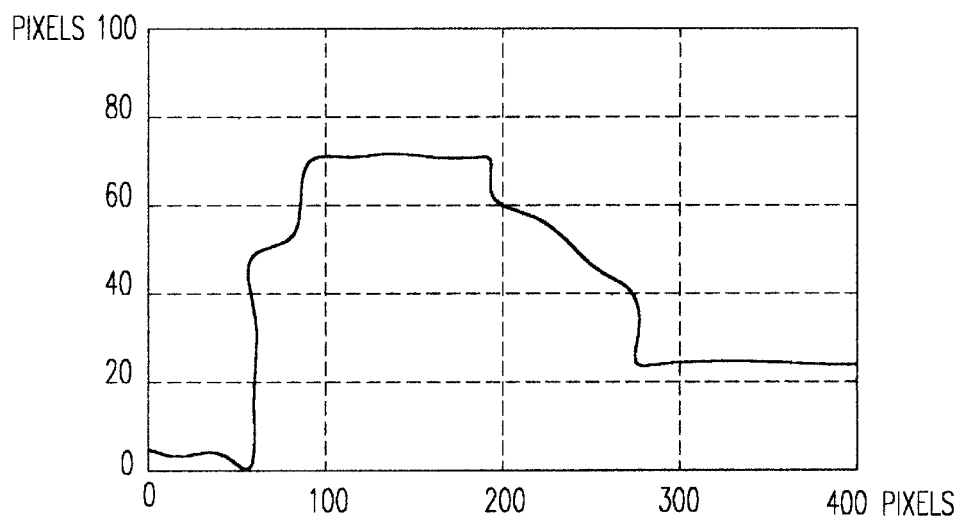
FIG. 13
| STYLE | $X_1$ | $X_2$ | $X_3$ | $X_4$ | $X_5$ |
|---|---|---|---|---|---|
| TOLER | 6 | 6 | 6 | 12 | 12 |
| GE1 | 54 | 135 | 200 | 43 | 81 |
| SE3 | 54 | 135 | 200 | 45 | 54 |
| F4 | 15 | 139 | 171 | 40 | 50 |
| 3R | 34 | 146 | 172 | 33 | 71 |
| R43 | 10 | 48 | 170 | 61 | 45 |
| 2S4 | 0 | 0 | 0 | 0 | 0 |
| T7 | 0 | 0 | 0 | 0 | 0 |
| K18 | 32 | 165 | 199 | 36 | 76 |
| GH5 | 42 | 167 | 196 | 40 | 46 |
| NJ0 | 34 | 130 | 199 | 41 | 54 |
| DD1 | 0 | 0 | 0 | 0 | 0 |
| AS3 | 33 | 133 | 198 | 40 | 52 |
FIG. 14

TESTING TEMPLATE STYLE 1.

| OFFSET | HEIGHT CORRECTION | MATCH RESULT |
|---|---|---|
| −3 | 6.28 | 191.1 |
| −2 | −5.88 | 160.9 |
| −1 | −5.47 | 133.7 |
| 0 | −4.67 | 69.9 |
| 1 | −3.88 | 29.4 |
| 2 | −3.08 | 9.8 |
| 3 | −2.47 | 40.2 |

TESTING TEMPLATE STYLE 2.

| OFFSET | HEIGHT CORRECTION | MATCH RESULT |
|---|---|---|
| −3 | −1.80 | 468.4 |
| −2 | −1.40 | 484.9 |
| −1 | −1.00 | 512.5 |
| 0 | −0.20 | 588.9 |
| 1 | 0.60 | 696.1 |
| 2 | 1.40 | 783.5 |
| 3 | 2.00 | 734.2 |

TESTING TEMPLATE STYLE 1.

| OFFSET | HEIGHT CORRECTION | MATCH RESULT |
|---|---|---|
| −3 | 6.88 | 518.6 |
| −2 | −6.47 | 552.2 |
| −1 | −6.08 | 594.4 |
| 0 | −5.67 | 645.9 |
| 1 | −5.28 | 787.2 |
| 2 | −4.88 | 973.1 |
| 3 | −4.28 | 1190.7 |

TESTING TEMPLATE STYLE 2.

| OFFSET | HEIGHT CORRECTION | MATCH RESULT |
|---|---|---|
| −3 | −2.40 | 54.0 |
| −2 | −2.00 | 41.7 |
| −1 | −1.60 | 32.6 |
| 0 | −1.20 | 21.8 |
| 1 | −0.80 | 7.3 |
| 2 | −0.40 | 33.8 |
| 3 | 0.20 | 95.0 | ns
AUTOMATIC IDENTIFICATION OF ARTICLES HAVING CONTOURED SURFACES

REFERENCE TO RELATED APPLICATIONS

This application is a continuation-in-part of U.S. Provisional Application Ser. No. 60/007,951, filed Dec. 4, 1995, which is herein incorporated by reference.

DESCRIPTION

Background of the Invention

1. Field of the Invention

The present invention generally relates to the automatic visual classification of three-dimensional articles and, more particularly, to the automatic classification of articles having contoured surfaces, such as, for example, cabinet doors and drawer fronts.

2. Description of the Prior Art

The largest manufacturers of kitchen and bathroom cabinets produce wooden components with many different shapes and sizes. For aesthetic reasons, some of these components are carefully molded and finished before final assembly. From a marketing perspective, subtle differences in appearance can be significant in distinguishing individual product lines. These differences are especially important for cabinet doors and drawer fronts which are exposed to the user.

One difficulty that is faced by these manufacturers is the identification of different components. Identification must be performed after applying paint or stain, and traditionally this has been performed manually by visual inspection with a trained eye. In recent years, manufacturers have dramatically increased the number of product styles in response to market forces. The result is that manual identification has become particularly tedious, labor-intensive, and prone to error.

SUMMARY OF THE INVENTION

It is therefore an object of the present invention to provide an automated system for classifying and labeling articles, and particularly cabinet door and drawer faces.

It is yet another object of the present invention to provide an automated system for identifying a particular cabinet face by size, shape, and style.

According to the invention, a system is provided for identifying cabinet doors and drawer fronts. Of course, the articles which can be identified are not limited to cabinets, but rather, may be extended to include such items as picture frames, bed boards, trim molding, or any other article which has a contoured face.

In the preferred embodiment, the system classifies door and drawer fronts traveling on a conveyor based on shape and size. The system uses structured light, three video cameras, and computer visioning techniques to determine the unique style and size code for each door.

In operation, a door to be identified moves in a forward direction on a conveyor belt. The door can travel either top-first or bottom-first. In order to determine the style of the door, the system determines which contour profile is present, whether the central panel of the face is flat or raised and whether the panel is square or cathedral shaped. In order to determine the door size, the system must measure the height and width of the door.

In order to characterize the profile and panel shape, two laser sources are used. Each laser produces a fan-shaped plane of light, perpendicular to the other, on the front face of the door. Lenses produce the planes optically so that no mechanical parts are needed. The fan shaped planes of light from the lasers produce a first profile stripe in the horizontal direction across the width of the door face and a second profile stripe in the vertical or length direction. A first video camera is used to capture the image of the profile stripe across the width of the door. In the preferred embodiment, a feature based approach is used to process the captured profile and compare it to a library of known profiles. A second camera is used to capture the profile stripe in the vertical direction to determine whether the panel shape is square or cathedral. A third camera, placed substantially parallel to the first camera to capture the width measurement of the door. Finally, the length of the door is determined with the aid of a photoelectric sensor wherein the sensor senses the time it takes for the moving door to pass a point along the conveyor. This time, along with the conveyor speed, are converted into a length measurement. Once the style of the door is determined, the door may pass through a next station where yet another video camera is used to determine the color of the door. Thereafter, a label identifying the style, size, and perhaps the color of the door is affixed to the door prior to shipping.

BRIEF DESCRIPTION OF THE DRAWINGS

The foregoing and other objects, aspects and advantages will be better understood from the following detailed description of a preferred embodiment of the invention with reference to the drawings, in which:

FIG. 12 is a graph showing an edge detection filter output;

FIG. 13 is a graph of an example image profile in units of image pixels;

FIG. 14 is a file containing tolerances and feature values for a library of styles;

DETAILED DESCRIPTION OF A PREFERRED EMBODIMENT OF THE INVENTION

Figure 1:
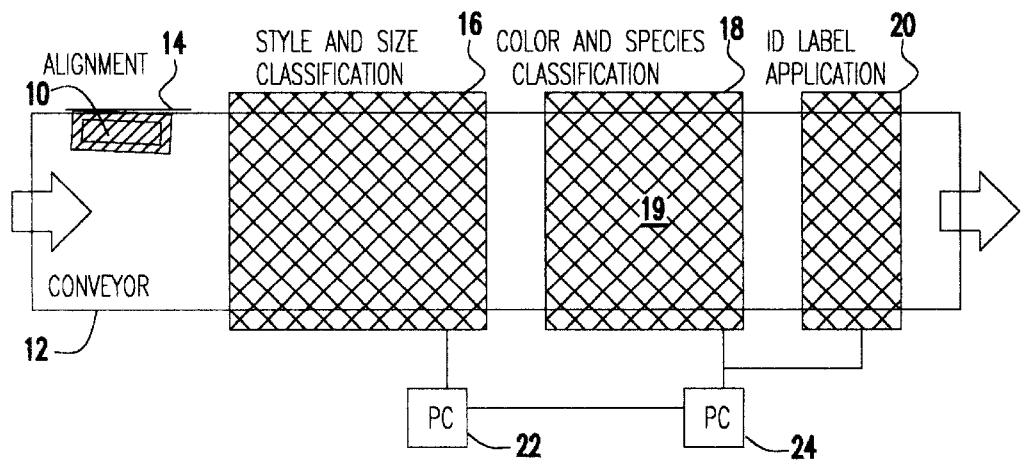
FIG. 1 is a schematic drawing of a conveyor belt classification system used for identifying and classifying contoured objects.

Referring now to the drawings, and more particularly to FIG. 1, there is shown a contoured object classification system according to the present invention. A door 10 is shown moving in a forward direction on a conveyor belt 12. As the door moves it is aligned by an alignment guide 14. After alignment along one edge of the conveyor, the door travels through two relatively independent classification stations. The system includes a first style and size classification station 16 and may also include a color and wood species identification station 18. The style and size classification station 16 classifies the model or style of door with computer video imaging techniques using a computer 22. The color and species identification station uses a color camera 19 to identify the color and species of the wood under the control of a computer 24. Finally, the door passes through an identification labeling station 20 which affixes to the door a label identifying the model and/or color and species of the door.

Figures 2A, 2B:
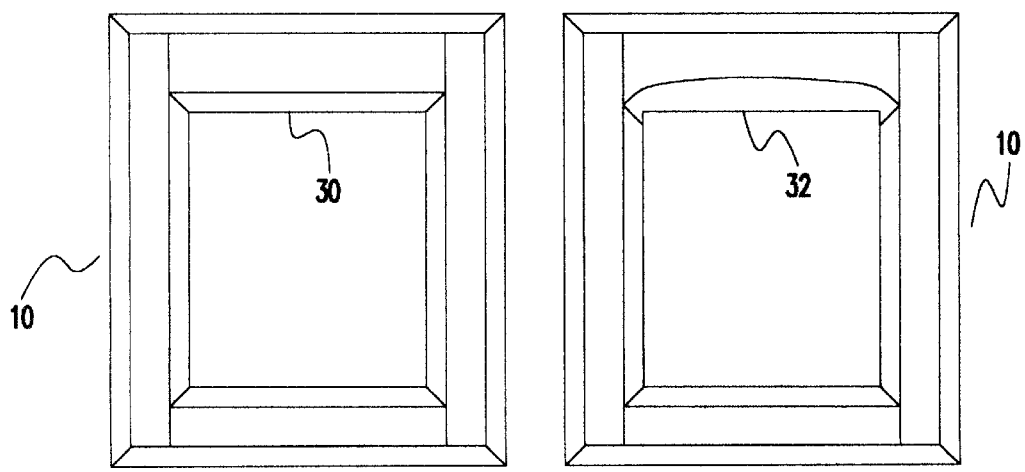
FIGS. 2A and 2B are examples of doors having square panel and a cathedral panel, respectively.

As mentioned previously, subtle differences in contour appearance can be significant in distinguishing individual product lines. As shown in FIGS. 2A and 2B, cabinet doors are formed by joining four molded sections around a central panel. The top portion of the panel may be square 30 or cathedral 32 in appearance. For cathedral-type doors 32, the amount of curvature of the top section varies with different door styles and with different sizes.

Figure 3A:
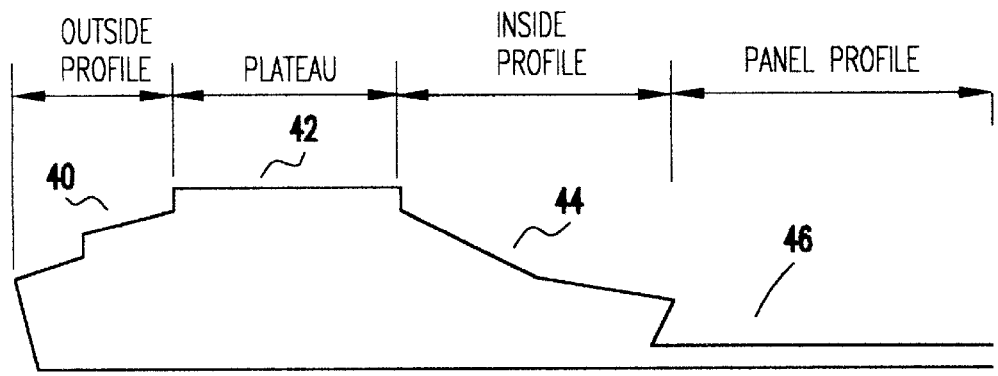
FIGS. 3A and 3B are examples of two different contour profiles having a flat panel and a raised panel, respectively.
Figure 3B:
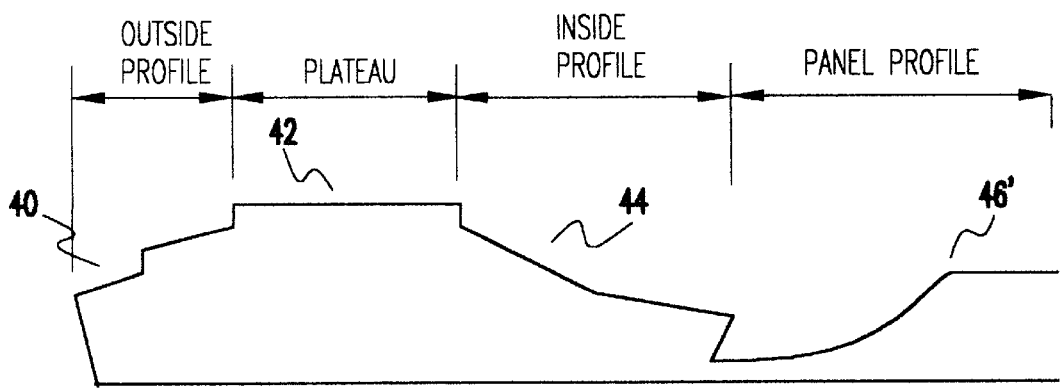

The shape of a door's moldings determines its cross-sectional profile. FIGS. 3A and 3B illustrate the distinguishing features between two different door profiles. Both profiles have an outside profile section 40, a plateau 42, an inside profile 44, and a panel profile 46. It is noted that the panel shown in FIG. 3A has a flat panel profile 46 while the panel shown in FIG. 3B has a raised panel profile 46'. A single manufacturer may have many different styles concurrently manufactured simply by mixing and matching profile shapes, plateaus, and panel types.

Figure 4:
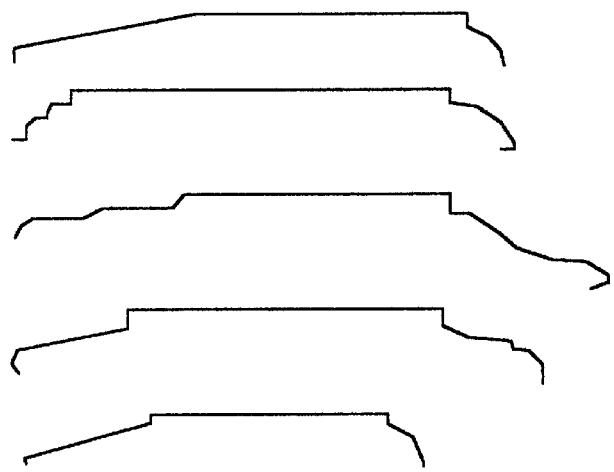
FIG. 4 shows respective computer aided design (CAD) of five outside and inside profiles of different door models.

FIG. 4 shows computer aided design (CAD) drawings of five different door models. It is noted that some profiles are quite different in appearance while others have only subtle differences. For each door, its profile must be classified as one of a known model (or as "unknown"). These profiles, together with variations in square/cathedral panel shape and raised/flat panel profile, result in many unique styles that must be recognized by the identification system. In addition, each style comes in different sizes. Hence, according to the present invention the style and size classification station 16 of FIG. 1 accurately identifies many different combinations.

Figure 5:
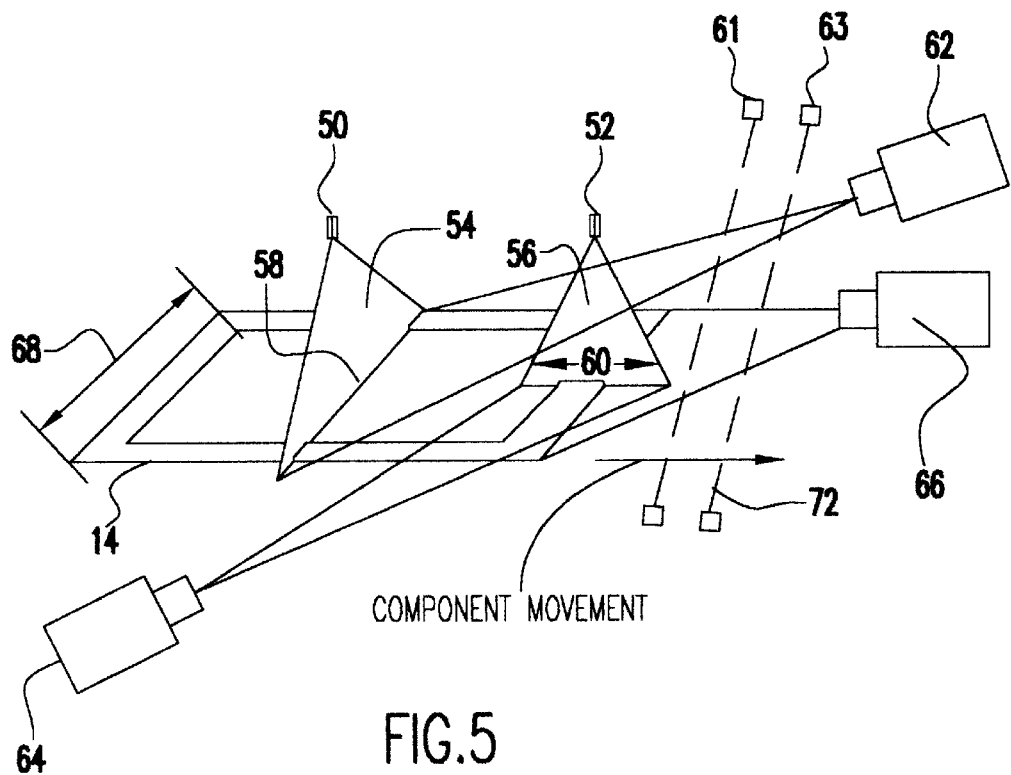
FIG. 5 is an isometric view of the laser and camera positions with respect to the door.

Referring now to FIG. 5, in order to characterize the profile and panel shape, two laser sources are used, 50 and 52. Each laser produces a fan-shaped plane of light, 54 and 56, perpendicular to the another, on front face of the door 14. The fan shaped planes of light, 54 and 56, from the lasers, 50 and 52, produce a first profile stripe 58 across the width of the door face and a second profile stripe 60 in the length direction.

A first video camera 62 is used to capture an image of the profile stripe 58 across the width of the door 14. A second camera 64 is used to capture the profile stripe 60 in the vertical direction to determine whether the panel shape is square or cathedral. A third camera 66 is placed substantially parallel to the first camera 62 to capture the width measurement 68 of the door 14. Leading and trailing photoelectric sensors, 61 and 63, determine the presence of doors and trigger image acquisition. In addition, the trailing sensor 63 is used to determine the length of the door 14, wherein the sensor 63 senses the time it takes for the moving door to pass a point 72 along the conveyor 12. This time, along with the conveyor speed, are converted into a length measurement.

Figure 6:
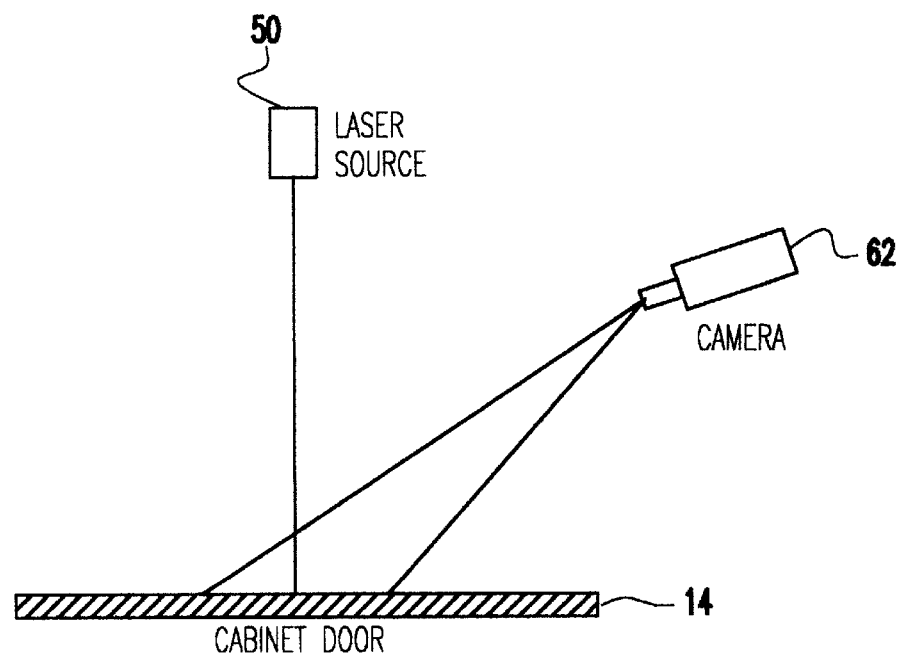
FIG. 6 is a side view of the imaging geometry for profile classification of a three dimensional object.

FIG. 6 is a side view of the imaging geometry for the profile classification shown in FIG. 5. FIG. 6 shows the side view of the first laser source 50 producing a profile stripe (not shown) on the door face 14. The first camera 62 captures the profile stripe image for computer analysis and classification.

Figure 7:
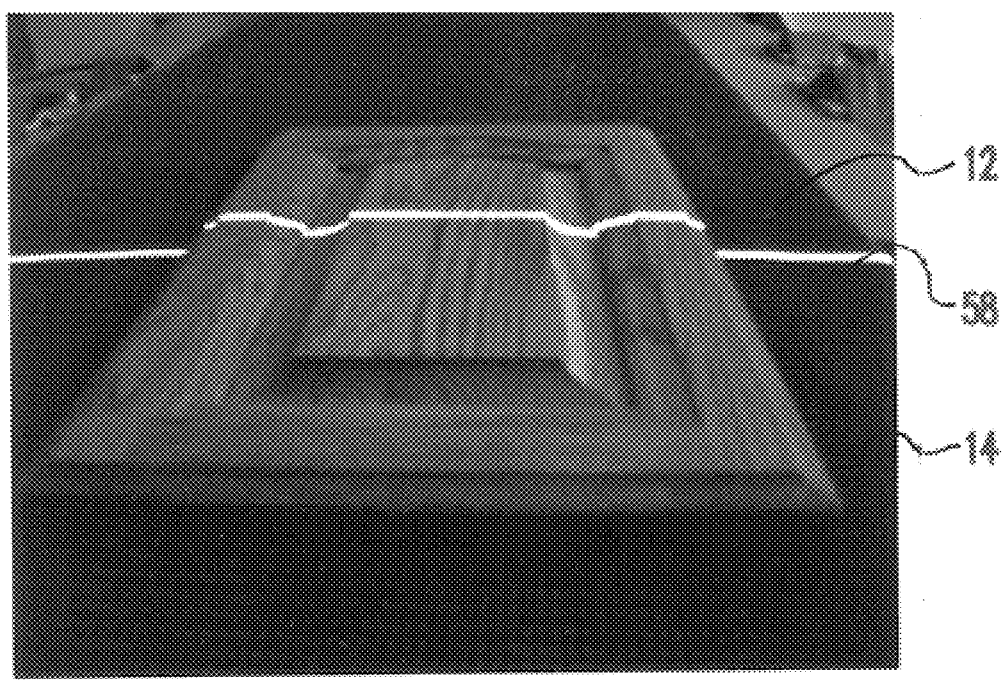
FIG. 7 is an isometric view of a cabinet door under a laser source showing the profile stripe in the width direction.

FIG. 7 is an illustrative isometric view of a cabinet door on the conveyor belt 12. As shown, the first laser 50 creates the profile stripe 58 in the width direction across the face of the cabinet door 14.

Figure 8:
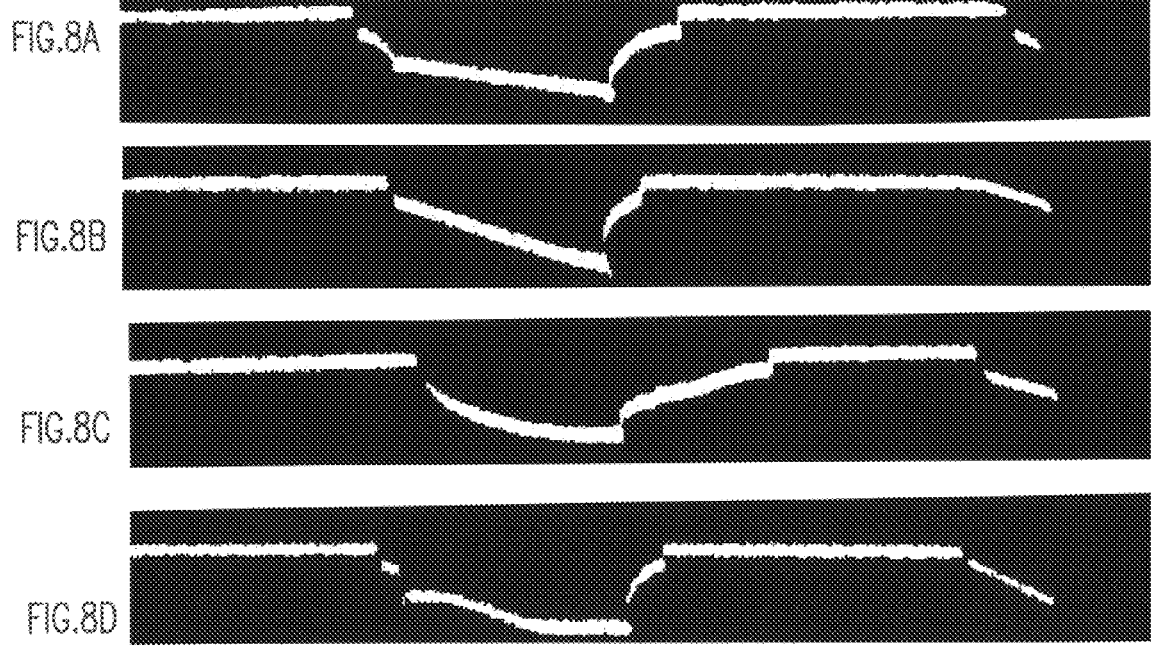
FIGS. 8A–8D are four examples of profile images for four different door styles.

FIG. 8 shows four examples of profile images that result from four different door styles. The images are portions of the width profile stripes 58 captured by the video camera 62.

Figure 9:
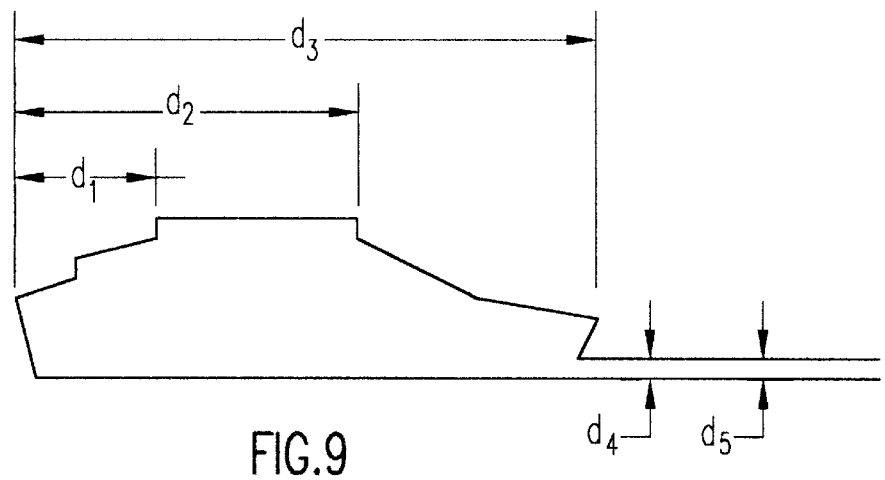
FIG. 9 is a representation view of a cabinet door showing example features which can be used for profile classification.

The classification features recognized by the system are illustrated in FIG. 9. Features d1 and d2 are the distances from the left edge of the profile to the two plateau ends, respectively. Feature d3 is the distance from the left edge of the profile to the innermost point of the inside profile. Features d4 and d5 represent the height values of two points on the panel. These five features are sufficient to distinguish most different inside/outside profile combinations and whether the panel is raised or flat. Of course, the features described above are specific to door and drawer faces. For classification of other objects, features specific to that object should be used.

The next step is to extract the above features from the images of profile stripes. Close examination of FIG. 8 will show that the laser region of each image is not a connected region, and that its border is not perfectly smooth. For these reasons, several preprocessing steps are needed before feature extraction can occur. The preprocessing steps comprise 1) a thresholding step, 2) a thinning step, and 3) a dropout replacement step. These steps are illustrated for one profile image in FIG. 10.

Figure 10A:
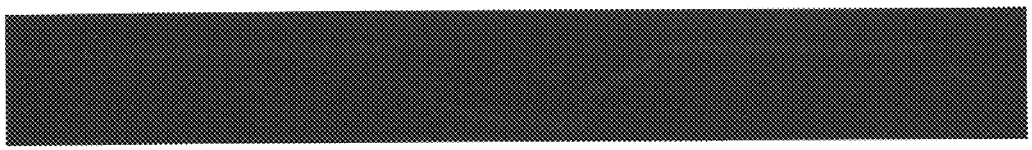
FIGS. 10A is an original profile image for the first processing step for profile classification.
Figure 10B:
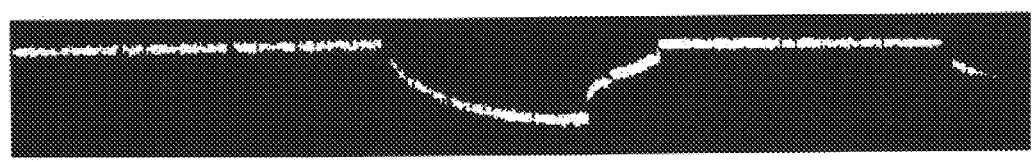
FIG. 10B is an original profile image after a thresholding step.

The original profile stripe image captured by the video cameras is digitized prior to analysis by the computer. The original image in FIG. 10A is thresholded immediately after A/D conversion using a lookup table, resulting in the image in FIG. 10B. The look-up table comprises a computer database of image pixel values for a library of profile styles. Thresholding involves determining whether a pixel captured by the camera is part of the profile stripe (foreground) or part of the background. Mathematically, this can be written as $$I_{new} = \begin{cases} \text{profile if } I > T \\ \text{background if otherwise} \end{cases}$$

where I is a given image pixel value from the video camera and $I_{new}$ is the resulting value after thresholding, and T is an empirically determined threshold.

Figure 10C:
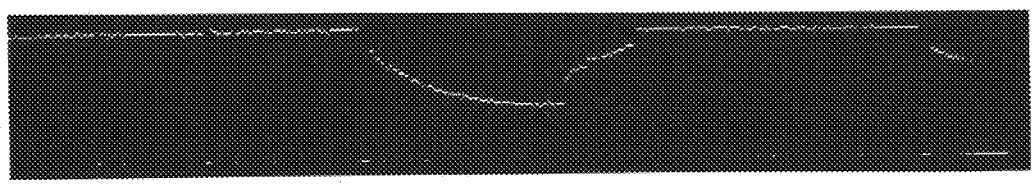
FIG. 10C is a thinned profile image having missing points highlighted at the bottom of the image.
Figure 10D:
FIG. 10D is a corrected profile image containing only the inside profile, plateau, and outside profile.

Because of the imaging geometry, a simple thinning step is possible. The image is processed one column at a time, retaining only the midpoint of the bright foreground region for each column. The result of this step is shown in FIG. 10C. Notice that this is not a single continuous curve. Points on the profile may be missing for several reasons, including roughness of the wood or small shadow regions on the door caused by occlusion of the laser. The rows with missing points are highlighted by small foreground points at the bottom of FIG. 10C. To simplify later processing, these "dropouts" in the profile curve are replaced by neighboring values. The result of this replacement step is shown in FIG. 10D.

The result of the preprocessing steps is a one dimensional profile curve p(i), where i is the row index of the original image. The index is offset so that i=1 references the first point on the curve. With this convention, features d4 and d5 are trivial to determine since they are simple height values of the profile array p for prestored values of i stored in a computer look-up table.

Figure 11A:
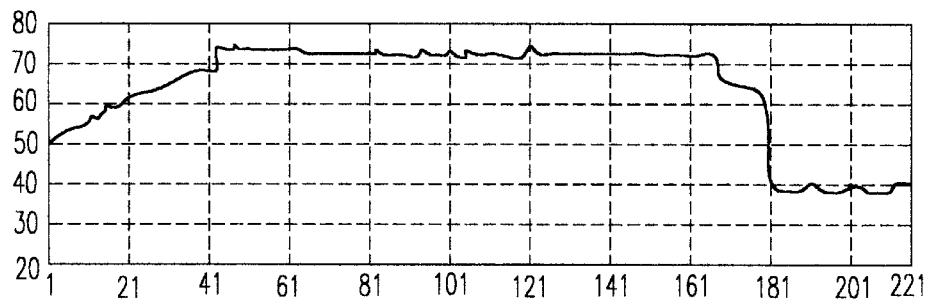
FIGS. 11A and 11B are graphs showing examples of the profile curve, without added Gaussian noise and with added Gaussian noise, respectively.
Figure 11B:
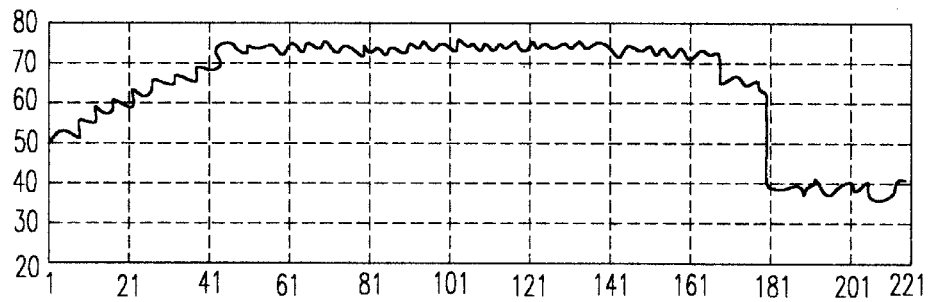

Features d1, d2, and d3 are more difficult to obtain reliably. These are the distances from the left edge of the profile (i=1) to the distinctive points on the profile. Locating these endpoints is accomplished by performing one-dimensional edge detection on p(i). Several edge detection filters were evaluated for this step. FIG. 11A and 11B show two plots of a typical profile curve. FIG. 11A results from preprocessing an actual camera image as described above. FIG. 11B is the same curve after artificially introducing additive Gaussian noise. Both of these curves were used to evaluate filtering alternatives. The major criteria in selecting a filter were localization accuracy, noise sensitivity, and processing speed. Although other filters are possible, selected here is:

$I_{new}(i)$=[1 1 1 0 −1 −1 −1] which is interpreted as $I_{new}(i)$=I(i−4)+ I(i−3)+I(i−2)+I(i−1)−I(I+1)−I(i+2)−I(i+3)−I(i+4).

For reasons of processing speed, a small filter size is essential, but because of noise, a larger filter is desirable. It was discovered that this filter satisfied both constraints satisfactorily. The results of using this filter are shown in FIG. 12. These filter was applied to the test profile in FIG. 11B. Response magnitude only is plotted.

In FIGS. 11 and 12, the horizontal, or x-axis, represents the image row or column along the profile of the image. The spikes near i=40 and i=181 indicate the end of the profile. By applying this filter and looking for these peaks, features d1 and d2 can be determined.

Referring again to FIG. 5, the system according to the present invention uses a second camera 66 to measure widths 68 of doors on the conveyor. This camera is placed to the side and approximately parallel to the first camera 66, but it has a larger field of view. The resulting profile image is processed to detect the opposite edge of the door 14. Since all doors are aligned on the conveyor, this edge location is easily mapped to a width measurement using a look-up table stored in the computer 22. High accuracy is not required in this case, because standard cabinet widths typically increase in increments of 1.5 inches.

The system measures door height using a photoelectric sensor 63. When a door 14 passes the sensor, it generates an interrupt on the host computer 22. The host then measures the time required for the door to pass the sensor 63 completely. This time interval is converted to a height measurement, based on the known conveyor speed.

The next factor to determine is panel shape, which may be square or cathedral as shown in FIGS. 2A–2B. The second laser 52 is present for this purpose, along with a third camera 64. This camera 64 and laser 52 are mounted at right angles to the other laser 50 and cameras 62 and 66. Two photoelectric sensors are used to trigger image acquisition by the cameras; one sensor for the leading edge of the door 61, and a second sensor for the trailing edge 63. The system determines that a cathedral panel is present if the plateau lengths in the leading and trailing profiles differ significantly.

The result of profile analysis is a set of features d1–d5 which are used to select the best match from the set of known profile shapes. The feature d5 also determines whether the panel is flat or raised. With this information, it is possible in most cases to determine the style code for the door. In the preferred embodiment, the approach adopted is as follows.

Referring now to FIG. 13, a graph of an example profile is shown. The vertical axis represents profile height, and is given in units of image pixels. The horizontal axis represents lateral distance as viewed from the camera, and is also given in units of image pixels.

The system extracts the five profile features (d1–d5) and compares them with expected dimensions for every known style stored in a computer database library. If all features are within a given tolerance of expected values for a single style, then that style code is reported. If any of the five features is outside a given tolerance for the closest known style, then the door is classified as "unknown." Furthermore, if all five features are within tolerance of more than one style, then the system classifies the door as "unknown" and lists all of the styles that are matched by the observed door. In the current system the horizontal tolerances are ±1/16", and the vertical tolerances are ±1/8". If course, these can be easily adjusted.

The following description states this identification method mathematically. We represent the five features as the vector, $x=[x_1, x_2, x_3, x_4, x_5]^T$ as illustrated earlier. These values are obtained by processing an image of a laser stripe which is obtained when a door is scanned. Let $\mu^{(j)}=[\mu_1^{(j)}, \mu_2^{(j)}, \mu_3^{(j)}, \mu_4^{(j)}, \mu_5^{(j)}]^T$ represent the expected value of for style j, and let $t=[t_1, t_2, t_3, t_4, t_5]^T$ represent the tolerance for each feature measurement. When a door is scanned, x is obtained and is compared with $\mu^{(j)}$ for all known styles.

The classification rule used by the system is as follows: Classify x as style family k if and only if 1) $|x_i - \mu_i^{(k)}| \leq t_i$
for all i=1, . . . , 5
and
2) no other style l exists (l≠k) such that $|x_i - \mu_i^{(l)}| \leq t_i$
for all i=1, . . . , 5.

If no style k satisfies these conditions, then the system reports "unknown." This is a conservative method that tends to avoid miscalculations.

To simplify system maintenance, the system may be modified to read expected values for each style family from a file at initialization. One version of this file is shown in FIG. 14. All quantities in the file are in units of pixels. The first line represents the tolerances for each feature, that is, 6 pixels implies 1/16" and 12 pixels implies 1/8". Each subsequent line represents one "style group," which is defined according to profile shape similarity. From left to right, the columns represent features $x_1$, $x_2$, $x_3$, $x_4$, and $x_5$, as illustrated earlier (d1–d5 and $x_1$–$x_5$ are used interchangeably).

A primary motivation for placing this information in a calibration file is to simplify the maintenance of duplicate classification systems for style families. It is expected that each system will require slightly different feature values, since cameras and other equipment items will be in slightly different positions for different systems. This method allows the storage of values that are specific to each system in separate calibration files. The same classification program will be run on each system, and it will read the appropriate calibration file during initialization. This method also facilitates the problem of adding new styles to the system.

Figure 15:
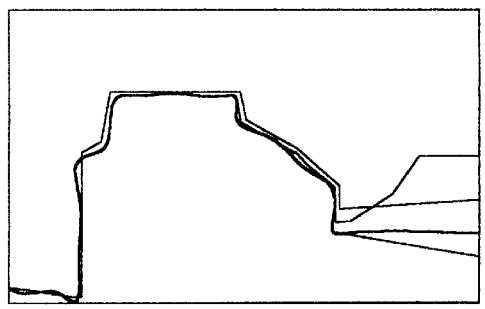
FIG. 15 is a graph showing four sample profiles superimposed on one another to show differences in panel shapes.

The feature-based method described above works well in many cases, even when large differences are present in profile shape. Sample differences are illustrated in FIG. 15, which shows four example profiles. The only difference in these profiles is the panel, shown at the right of the figure. Shown are two distinct panel shapes. One reason for such large differences is these profile curves is that doors are often not manufactured to tight tolerances. Because the door moldings are decorative and not functional in nature, high accuracy is not important. Tools wear over time, and this can cause small changes in profile shape. Further, the material properties of wood do not easily permit shaping that can be repeated to high accuracy, such as for example to less than $\frac{1}{16}$ inches.

Figure 16A:
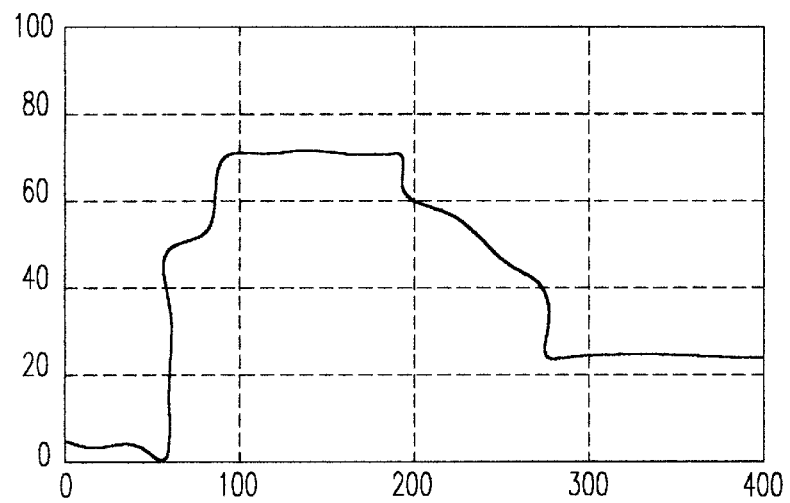
FIGS. 16A and 16B are two example profiles which differ only at the inside profile.
Figure 16B:
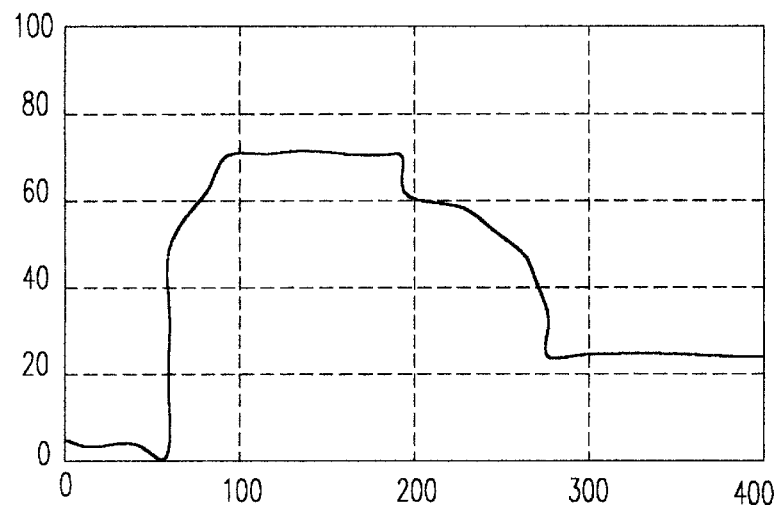

Although the method described above works well for most articles, it may be insufficient to distinguish door profiles that are ideally very similar. To illustrate this problem, two example profiles are shown in FIGS. 16A and 16B. The only difference that should be present is very subtle, and it exists only at the inside profile for the styles shown (horizontal locations 200–250). These two styles are quite difficult to distinguish when variations due to manufacturing imprecision and/or materials properties can occur.

Hence, the classification method used here makes use of the five features described earlier, and additionally uses template matching to distinguish these inside profiles. Template matching involves taking a known, stored profile, and "sliding" it across a scanned profile that must be identified. At each relative position of the two profiles, the difference between them is computed. Normally, the measured difference will be very small for the correct template, but will be relatively high for any incorrect template.

Identification based purely on template matching tends to be inaccurate. Hence a novel aspect of the present invention is to combine distinctive feature-based matching (using $x_1$, $x_2$, $x_3$, $x_4$, and $x_5$) with template matching. Furthermore, the present invention may employ a height normalization step which allows the system to ignore simple differences in height. For template matching, it is the shape of the inside profile, not the absolute height, that is most important. In the current system, template matching is used for inside profiles only, and only for the particular styles that are very similar in appearance.

The template-matching method is described by the following equation:

$$f(j) = \min_k \left( \sum_{i=1}^{N} (T_j(i) - [P(i-k) - h_k])^2 \right)$$

where P(i) is the value of the door profile that has been scanned at point i; $h_k$ is the difference in average height between the template and the profile at position k; $T(j)_i$ is the value of template j for point i; f(j) is the minimum of the sum of squared Euclidean distances computed for all shift amounts k; k assumes the values –3, –2, . . . , 2, 3; and N is the size of the template in pixels.

A template is shifted over the profile horizontally to seven different positions as k varies from –3 to 3. The height normalization pre-adjusts for vertical variations, eliminating the necessity of shifting the template vertically and saving processing time. The height normalization difference is calculated for each attempted match as the template is shifted horizontally. This is done because the average height of the profile section being matched will change as the match section is horizontally shifted. The best match determines a template that is associated with only one of the two style families under consideration.

The classification rule given earlier is now modified so that if the particular similar styles in question are identified using features $x_1$, $x_2$, $x_3$, $x_4$, and $x_5$, then template matching is performed over the inside profile region using pre-stored templates. The style is assigned such that its stored template minimizes the criterion f(j). In order to avoid false matches, f(j) must also be less than an empirically determined threshold value. During extensive tests of this method, correct matches always caused values of f(j) that were much less than this threshold, and non-matches caused values of f(j) that were much higher than this threshold.

Some sample results from the template matching approach are shown in FIGS. 17A–B and 18A–B. In each case, the heavy line is the partial template being matched which has already been height normalized and is shown at its best match position. The light gray line is the scanned door profile itself. The figures also list the computed values for these two cases.

Figure 17A:
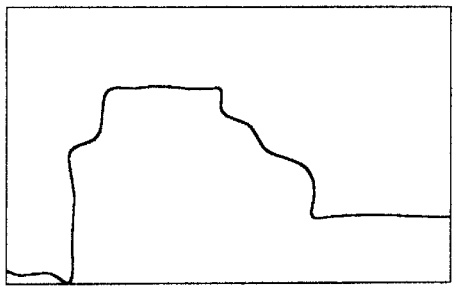
FIGS. 17A and 17B is an example of template matching for a first example door.
Figure 17B:
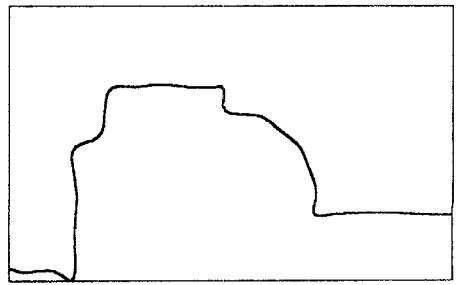

FIGS. 17A–B show a template matching for example door 1. Its profile is shown in both graphs above in light gray. The minimum match results are highlighted in the tables shown below the graphs. In this case, the chosen match is style 1, with a result of 9.8. Note that the style 2 result is well above the chosen threshold value of 150.

Figure 18A:
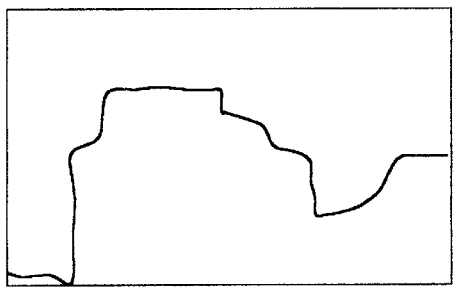
FIGS. 18A and 18B is an example of template matching for a second example door.
Figure 18B:
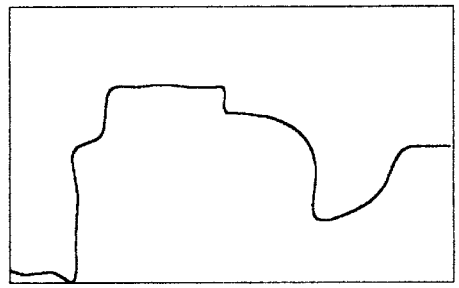

Similarly, FIGS. 18A–B show a template matching for example door 2. Again, the match results are highlighted for each template. In this case, the style 2 is chosen, with a result of 7.3 Note that the style 1 result is well above the chosen threshold of 150.

After determining the style code, the size code is determined. This is implemented as a look-up table, mapping the observed width and height to one of known size codes.

While the invention has been described in terms of a single preferred embodiment, those skilled in the art will recognize that the invention can be practiced with modification within the spirit and scope of the appended claims.

We claim:

1. A system for distinguishing similar three dimensional cabinet faces, comprising:

a first laser source for creating a first profile stripe across at least a portion of cabinet face in a first direction;

a first camera for capturing an image of the first profile stripe;

control means for matching the image of the first profile stripe to a prestored profile stripe image indicating a particular style code for said cabinet face;

a second laser source for creating a second profile stripe across at least a portion of the cabinet face in a second direction;

a leading sensor for detecting a leading edge of the cabinet face;

a trailing sensor for detecting a trailing edge of the cabinet face; and a second camera, triggered by said leading sensor and said trailing sensor, for capturing a leading profile stripe and a trailing profile stripe of a plateau region of said cabinet face, said control means determining if a cathedral style cabinet face is present if said leading profile stripe differs from said trailing profile stripe by a threshold value.

2. A system for distinguishing similar three dimensional articles as recited in claim 1, wherein said first profile stripe is oriented in a width direction of the cabinet face and said second profile stripe is oriented in a length direction of the cabinet face.

3. A system for distinguishing similar three dimensional articles, comprising:

a first laser source for creating a first profile stripe across at least a portion of an article in a first direction;

a first camera for capturing an image of the first profile stripe;

control means for matching the image of the first profile stripe to a prestored profile stripe image indicating a particular style code for said article;

a conveyor belt for moving the article through a plurality of stations;

a style classification station comprising said first laser source and said first camera for determining a style of said article; and an identification label station connected to said control means for placing a label on the article indicating at least one of the color code and the style code for the article.

4. A system for distinguishing similar three dimensional articles as recited in claim 3 further comprising:

a color classification station comprising a color camera for supplying a color video signal to said control means, said control means comparing said color video signal to prestored color codes for determining a color code for said article.

5. A system for distinguishing similar three dimensional articles as recited in claim 3, further comprising alignment means for aligning the article with respect to said conveyor.

6. A system for distinguishing similar three dimensional articles as recited in claim 3 further comprising a sensor means for sensing in a time period that the article takes to pass a point, said control means calculating a length measurement for the article based on the time period a speed of said conveyor.

7. A method for identifying unknown articles having a contoured surface comprising steps of:

producing at least a first profile stripe across the contoured surface of the unknown article with a light, said first profile stripe comprising a shape of said contoured surface of the unknown article;

capturing an image of said first profile stripe;

comparing said first profile stripe to a library of stored profile stripes for known articles;

matching said first profile stripe to a profile stripe in said library to determine the identity of the unknown article;

thresholding said image of said first profile stripe by comparing pixel intensities of said image against a threshold value to determine if said pixel is profile stripe foreground or background;

thinning each pixel row in said profile stripe by retaining a center pixel and deleting other pixels in said pixel row;

identifying measurements from said center pixels for a plurality of distinctive features in said profile stripe;

comparing said measurements to a library of known measurements for a known article;

subtracting said measurements from said known measurements; and selecting as a match those measurements which are below a predetermined threshold.

8. A method for identifying unknown articles having a contoured surface comprising the steps of:

producing at least a first profile stripe across the contoured surface of the unknown article with a light, said first profile stripe comprising a shape of said contoured surface of the unknown article;

capturing an image of said first profile stripe;

comparing said first profile stripe to a library of stored profile stripes for known articles;

matching said first profile stripe to a profile stripe in said library to determine the identity of the unknown article;

storing a library of at least partial profile stripe templates for a plurality of known articles;

shifting said profile stripe templates across said image of said first profile stripe in discrete steps;

computing a difference between said profile stripe templates and said image of said first profile stripe at each discrete step; and identifying said unknown article by selecting as a match one of said profile stripe templates having a smallest difference from said computing step.

* * * * *